United States Patent [19]

Asano et al.

[11] Patent Number: 4,737,369

[45] Date of Patent: Apr. 12, 1988

[54] FAT-CONTAINING POWDER PRODUCT QUICKLY DISPERSIBLE IN COLD WATER AND PROCESS FOR PREPARING THE SAME

[75] Inventors: Ichiro Asano, Suzuka; Kozaburo Mori, Tokyo, both of Japan

[73] Assignee: Ajinomoto General Foods, Inc., Tokyo, Japan

[21] Appl. No.: 22,161

[22] Filed: Mar. 5, 1987

[30] Foreign Application Priority Data

Mar. 11, 1986 [JP] Japan .................................. 61-53413

[51] Int. Cl.$^4$ .............................................. A23C 11/02
[52] U.S. Cl. ........................................ 426/98; 426/602
[58] Field of Search ................................. 426/98, 602

[56] References Cited

U.S. PATENT DOCUMENTS

| | | | |
|---|---|---|---|
| 3,098,748 | 7/1963 | Noznick et al. | 426/98 |
| 3,443,960 | 5/1969 | Noznick et al. | 426/602 X |
| 4,242,364 | 12/1980 | Buddemeyer et al. | 426/98 |
| 4,310,556 | 1/1982 | Suggs et al. | 426/98 X |
| 4,341,811 | 7/1982 | Rule | 426/602 |

*Primary Examiner*—Raymond N. Jones
*Assistant Examiner*—Celine Callahan
*Attorney, Agent, or Firm*—Linn I. Grim; Daniel J. Donovan

[57] ABSTRACT

The present invention relates to a process for preparing a fat-containing powder product which is readily wettable and dispersible even in cold water. More particularly, the present invention pertains to a process for preparing a fat-containing powder product which is quickly dispersible in cold water characterized by comprising coating at least a part of the surface of fat-containing powder particles with mono- and/or di-glyceride of a medium chain fatty acid.

10 Claims, No Drawings

FAT-CONTAINING POWDER PRODUCT QUICKLY DISPERSIBLE IN COLD WATER AND PROCESS FOR PREPARING THE SAME

DESCRIPTION

The present invention relates to a process for preparing a fat-containing powder product which is readily wettable and dispersible even in cold water. More particularly, the present invention pertains to a process for preparing a fat-containing powder product which is quickly dispersible in cold water characterized by comprising coating at least a part of the surface of fat-containing powder particles with mono- and/or di-glyceride of a medium chain fatty acid.

PRIOR ART

The conventional fat-containing powder, for example, creamer for coffee, cannot be easily dispersed in cold water; it floats on the surface of water in the shape of large lumps without becoming dispersed or experiencing sedimentation even after vigorous agitation. Many people have, in many different ways, tried to improve such poor dispersibility of fat-containing powder in cold water. Some of the methods attempted are given below.

One of them is a method in which a fat-containing powder is granulated by an instantizer or other similar means. In another proposed method, a solubilizing gas is blown through condensed milk, which is then dried to obtain porous particles or granules. With these methods, dispersibility of fat-containing powder in water at about 20° C. is attainable, but its dispersibility in cold water cannot be enhanced. Thus, these methods play only auxiliary roles in improvement of dispersibility.

In still another proposed method, a medium chain triglyceride (hereinafter MCT) consisting of a fatty acid having 6 to 10 carbon atoms is mixed into a fatty raw material so as to improve the cold water dispersibility of a fat-containing powder produced by employing this fatty raw material (see Japanese patent publication No. 20578/1983). Although this method is effective in improvement of cold water dispersibility, commercialization of such a product is hindered by the expensiveness of the MCT, and it is necessary to make some improvements from the viewpoint of economy.

A further method has been proposed wherein lecithin and a sucrose fatty acid ester are coated on the surface of fat-containing powder particles so as to improve the dispersibility of the product in cold water (see Japanese patent Laid-Open No. 7774/1972). The cold water dispersibility of the fat-containing powder product obtained by this method greatly changes in accordance with the temperature of the product when used. More specifically, when the temperature of the product is low in actual use, the dispersibility remarkably deteriorates. For this reason, in order to allow the fat-containing powder to disperse in cold water even when the temperature of the product is low, e.g., at 20° C. or lower, the amount of lecithin must be increased considerably. An increase in the amount of lecithin results in an adverse effect on the taste. In addition, since lecithin is readily oxidized, the keeping quality of the fat-containing powder product is degraded.

For the above-described reasons, it is desired to produce a fat-containing powder which is excellent in terms of economy, quality and shelf life and yet is quickly dispersible in cold water (e.g., water at 3° C. or lower).

It is particularly desired to develop a fat-containing powder product which is quickly dispersed in cold water even when the temperature of the product is relatively low, i.e., 20° C. or lower, as in the case where it has been stored in a refrigerator or at relatively low room temperatures.

(Means for Solving the Problems)

The present inventors have found a process for preparing a fat-containing powder product which is quickly dispersed in cold water even when the temperature of the product is relatively low, by coating at least a part of the surface of fat-containing powder particles with a mono- and/or di-medium chain glyceride (hereinunder MCG) consisting of a fatty acid having 6 to 10 carbon atoms, preferably 8 to 10 carbon atoms.

Since the MCG itself is somewhat bitter, the flavor of the product may be degraded if the MCG is used in its original condition. To overcome this disadvantage, the MCG is dissolved into an amphipatic solvent, e.g., propylene glycol, ethanol, etc., and a powder product quickly dispersible in cold water is thereby obtained without degrading the flavor.

The fat-containing powders to which the present invention may be applied include edible dry powders such as creaming powders, instant soup powders, ice-cream mix powders, etc. These powders may be produced in such a manner that an edible oil such as coconut oil, palm oil, palm kernel oil, soybean oil, corn oil, cotton seed oil, rape seed oil, milk fat, beef tallow, lard, etc., a sugar such as sucrose, glucose, starch hydrolyzate, etc., and other raw materials such as sodium caseinate, sodium secondary phosphate, sodium citrate, skimmed milk, an emulsifier, etc. are selected for their respective purposes, dispersed in water, homogenized and dried.

The MCG which can be used in the present invention includes mono- or di-glyceride of medium chain fatty acids or mixtures of both. Mono- or di-glyceride of a capric acid or caprylic acid having 8–10 carbon atoms, or a mixture of both, is particularly preferable. When a mixture is used, the ratio between caprylic acid and capric acid or the mixing ratio of the monoglyceride and diglyceride is not critical. However, the higher the ratio of caprylic acid to capric acid and the ratio of monoglyceride to diglyceride, the more the cold water dispersibility of the product is improved.

In addition, it is possible to employ as a coating agent an MCG-containing reaction mixture obtained by partially saponifying an MCT with an alkali and removing a fatty acid alkali salt produced as a by-product by separation, or without removing the by-product.

The amount of MCG is preferably 0.01 to 1.0% by weight, more preferably 0.04 to 0.5% by weight, based on the amount of the fat-containing powder. If the amount of MCG is less than 0.01% by weight, the cold water dispersibility may not be satisfactorily improved, although it depends on the kind of product. An amount of MCG in excess of 1.0% by weight may have an adverse effect on the flavor of the product.

The MCG is dissolved in an amphiphatic solvent as described above and sprayed on a fat-containing powder in a conventional manner, whereby the MCG can be coated on the powder. Alternatively, MCG may be coated on a fat-containing powder after it has been granulated.

A fat-containing powder which has been coated with MCG by the method according to the present invention may be granulated and coated with MCG again if necessary, whereby the cold water-quickly-dispersible property can be further improved.

The present invention will be explained in more detail by the following examples.

EXAMPLE 1

Five grams of stearic acid monoglyceride and 3 g of sorbitan monostearate were mixed and dissolved in 760 g of an oil mixture (iodine value: 75, melting point: 15° C.) of 80% of hydrogenated rape seed oil and 20% of palm kernel oil.

Separately, 900 g of corn syrup solid, 180 g of sodium caseinate and 15 g of sodium secondary phosphate were dissolved in 2.2 kg of water.

The two solutions were mixed together and emulsified under agitation at 60° C. for 30 minutes, homogenized under a pressure of 200 kg/cm$^2$, and powdered by a conventional spray drying method. Two hundred grams of corn syrup solid was added and mixed to 800 g of resultant powder and then granulated under moistening. The surface of the granules thus obtained was sprayed with a solution in propylene glycol of 50% by weight of caprylic acid monoglyceride containing a part of sodium caprylate, thus preparing a fat-containing powder product.

EXAMPLE 2

In place of the caprylic acid monoglyceride containing a part of sodium caprylate which had been employed in Example 1, caprylic acid monoglyceride containing no salt was used, and a fat-containing powder product was prepared in a manner similar to that in Example 1.

COMPARATIVE EXAMPLE 1

To provide comparison between the products prepared by the method of the present invention and products prepared by methods other than that of the present invention in terms of their cold water dispersibility and flavor, comparative products were prepared. More specifically, in place of the caprylic acid monoglyceride containing a part of sodium caprylate which had been employed in Example 1, the additives listed in Table 1 below were used, and fat-containing powder products were prepared in the same way as specified in Example 1.

The dispersibility and flavor of the products of Comparative Example 1 and the products of Examples 1 and 2 were tested by the following methods. The results are shown in Table 1.

Dispersibility Test:

Three grams of each of the samples held at a predetermined temperature was cast into a beaker containing 180 g of cold water at 5° C., and the time required for the sample to sink below the water surface was measured.

Flavor Evaluation:

An organoleptic test was carried out in the following manner. Ten panel members tasted 1.5 g of each of the samples alone in its original condition. The numbers of panel members who perceived any offensive taste or smell are shown in the column headed "Flavor" in Table 1.

TABLE 1

| | Additive | | Cold water dispersibility Temperature | | | |
|---|---|---|---|---|---|---|
| | Name | Amount (wt %) | 10° C. | 15° C. | 20° C. | Flavor |
| Example 1 | Caprylic acid monoglyceride containing sodium caprylate | 0.5 | 6 seconds | 4 seconds | 4 seconds | 2 |
| Example 2 | Caprylic acid monoglyceride | 0.2 | 15 seconds | 8 seconds | 5 seconds | 0 |
| Comparative Example 1 | Soybean lecithin | 0.5 | more than 2 minutes | → | → | 5 |
| | Soybean lecithin | 1.0 | more than 2 minutes | → | 22 seconds | 8 |
| | Oleic acid monoglyceride | 1.0 | more than 2 minutes | → | 48 seconds | 5 |
| | Sugar ester | 1.0 | more than 2 minutes | → | 38 seconds | 4 |
| | Sorbitan monostearate | 1.0 | more than 2 minutes | → | 25 seconds | 7 |
| | Polyglycerol | 1.0 | more than 2 minutes | → | 45 | 8 |
| | No additive | — | more than 2 minutes | → | → | 0 |

As will be clear from Table 1, when conventionally employed emulsifying agents are coated on fat-containing powder, the cold water dispersibility is greatly affected by the temperature of the product when used. With such agents, when the temperature of the product is 20° C. or lower, the product is hardly soluble in cold water. If the amount of emulsifying agent is increased in order to improve the cold water dispersibility, the flavor is degraded. When the MCG in accordance with the present invention is coated on a fat-containing powder, the cold water dispersibility is not affected by the temperature of the product when used. Thus, it is possible to obtain excellent cold water dispersibility with a relatively small amount of additive.

EXAMPLE 3

In place of the caprylic acid monoglyceride employed in Example 2, capric acid monoglyceride was used, and a fat-containing powder was prepared in the same way as specified in Example 2.

EXAMPLE 4

In place of the caprylic acid monoglyceride employed in Example 2, caprylic acid diglyceride was used, and a fat-containing powder was prepared in the same way as specified in Example 2.

COMPARATIVE EXAMPLE 2

A fat-containing powder was prepared in the same way as specified in Example 2 except for replacing the caprylic monoglyceride employed in Example 2 by lauric acid monoglyceride ($C_{12}$ fatty acid monoglyceride).

The product thus obtained and the products obtained in Examples 3 and 4 were tested in a manner similar to that described in Comparative Example 1. The results are shown in Table 2.

TABLE 2

| | Additive | | Cold water dispersibility Temperature | | | |
|---|---|---|---|---|---|---|
| | Name | Amount (wt %) | 10° C. | 15° C. | 20° C. | Flavor |
| Example 3 | Capric acid monoglyceride | 0.2 | 45 seconds | 34 seconds | 8 seconds | 0 |
| Example 4 | Capric acid diglyceride | 0.2 | 30 seconds | 21 seconds | 11 seconds | 0 |
| Comparative Example 2 | Lauric acid monoglyceride | 1.0 | more than 2 minutes | more than 2 minutes | more than 1 minutes | 3 |

As will be understood from Table 2, the cold water dispersibility of the product cannot be improved by the use of lauric acid monoglyceride.

EXAMPLE 5

In place of the oil mixture of 80% of hydrogenated rape seed oil and 20% of palm kernel oil employed in Example 1, palm kernel oil (iodine value: 18, melting point: 27° C.) was used, and a spray-dried powder was obtained in the same manner as described in Example 1. The surface of this powder was sprayed with a solution in propylene glycol of 50% by weight of caprylic acid monoglyceride so that 1.0% by weight of MCG was coated on the powder surface, and then dried. Two hundred grams of glucose was added and mixed to 800 g of the powder thus obtained and then granulated under moistening to obtain a fat-containing powder product.

EXAMPLE 6

In place of the palm kernel oil employed in Example 5, hydrogenated rape seed oil (iodine value: 85, melting point: 13° C.) was used, and spray-dried fat-containing powder was obtained in the same manner as described in Example 1. The surface of this powder was sprayed with a solution in ethanol of 50% by weight of caprylic acid monoglyceride so that 0.03% by weight of MCG was coated on the powder surface. Two hundred grams of glucose was added and mixed to 800 g of the powder thus obtained, and then granulated under moistening to prepare a granulated fat-containing powder product.

COMPARATIVE EXAMPLE 3

A spray-dried fat-containing powder was obtained in the same way as in Example 5. In place of the solution of propylene glycol, a solution in rape seed oil of 50% by weight of caprylic acid monoglyceride was sprayed on the surface of the powder thus obtained. Then, a granulated fat-containing powder product was obtained in a manner similar to that in Example 5.

COMPARATIVE EXAMPLE 4

A spray-dried fat-containing powder obtained in the same way as in Example 5 was sprayed with a solution in propylene glycol of 50% by weight of caprylic acid monoglyceride so that 1.5% by weight of MCG was coated on the powder surface. Then, a granulated fat-containing powder product was obtained in a manner similar to that in Example 5.

The products of Examples 5, 6 and Comparative Examples 3, 4 were tested by the methods described in Comparative Example 1.

The results are shown in Table 3.

TABLE 3

| | Additive | | Cold water dispersibility Temperature | | | |
|---|---|---|---|---|---|---|
| | Name | Amount (wt %) | 15° C. | 20° C. | 25° C. | Flavor |
| Example 5 | Caprylic acid monoglyceride | 1.0 | 50 (sec) | 28 (sec) | 15 (sec) | 5 |
| Example 6 | Caprylic acid monoglyceride | 0.03 | 45 | 23 | 10 | 0 |
| Comparative Example 3 | Caprylic acid monoglyceride | 1.0 | 62 | 37 | 21 | 10 |
| Comparative Example 4 | Caprylic acid monoglyceride | 1.5 | 44 | 21 | 12 | 10 |

As will be clear from Table 3, if the amount of MCG is in excess of 1.0% by weight, the flavor is considerably degraded. It was also found that when MCG is dissolved in rape seek oil rather than in an amphipatic solvent, even if the amount of MCG is 1.0% by weight, the flavor of the product is greatly degraded.

What is claimed is:

1. A composition comprising fat-containing powder particles coated with a glyceride selected from the group consisting of mono-glyceride of a fatty acid containing 8 to 10 carbon atoms, a di-glyceride of a fatty acid containing 8 to 10 carbon atoms and mixtures thereof, the amount of glycerides present on said fat-containing powder is above 0.01 to below 1.0 weight percent based on the total powder product.

2. The composition of claim 1 wherein the amount of glyceride on the fat-containing powder is about 0.04 to 0.5% by weight.

3. The composition of claim 2 wherein the glyceride is capric acid monoglyceride.

4. The composition of claim 2 wherein the glyceride is capric acid diglyceride.

5. The composition of claim 2 wherein the glyceride is caprylic acid monoglyceride.

6. The composition of claim 2 wherein the glyceride is caprylic acid diglyceride.

7. The process for preparing a fat-containing powder product which is quickly dispersible in water which comprises coating said fat-containing powder particles with a glyceride selected from the group consisting of mono-glyceride of a fatty acid containing 8 to 10 carbon atoms, a di-glyceride of a fatty acid containing 8 to 10 carbon atoms and mixtures thereof, the amount of glycerides coated on said fat-containing powder particles is above 0.01 to below 1.0 weight percent based on the total powder product.

8. The process of claim 7 wherein the amount of glycerides coated on the fat-containing powders is about 0.04 to about 0.5% by the weight of the total powder product.

9. The process of claim 8 wherein glycerides are dissolved in edible solvents and coated on the fat-containing powder particles.

10. The process of claim 9 wherein the edible solvents are ethanol or propylene glycol.

* * * * *